July 16, 1940.  R. W. BUMSTEAD  2,207,715
TELEMETERING AND TABULATING TIMER
Filed July 6, 1934  5 Sheets-Sheet 4
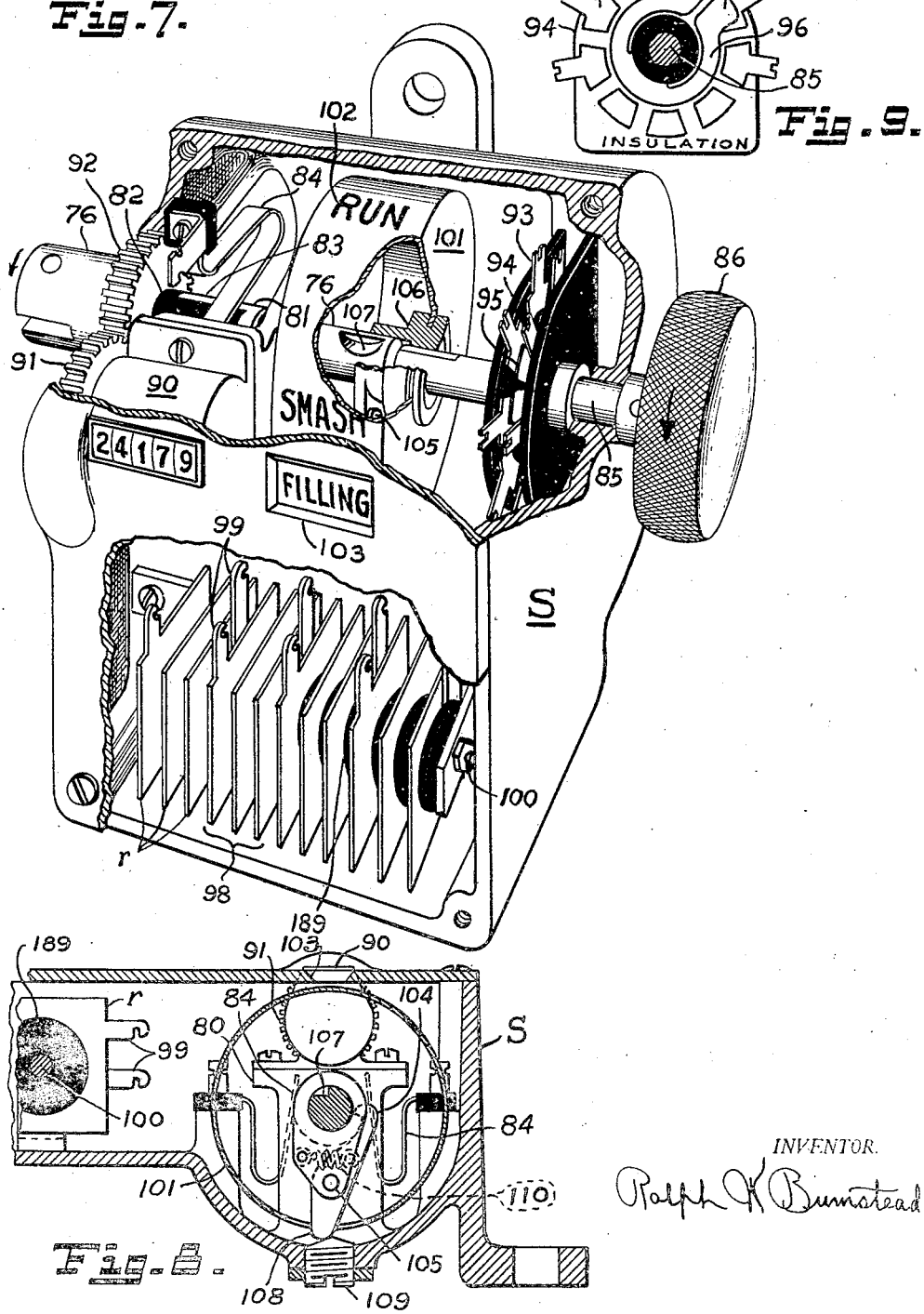

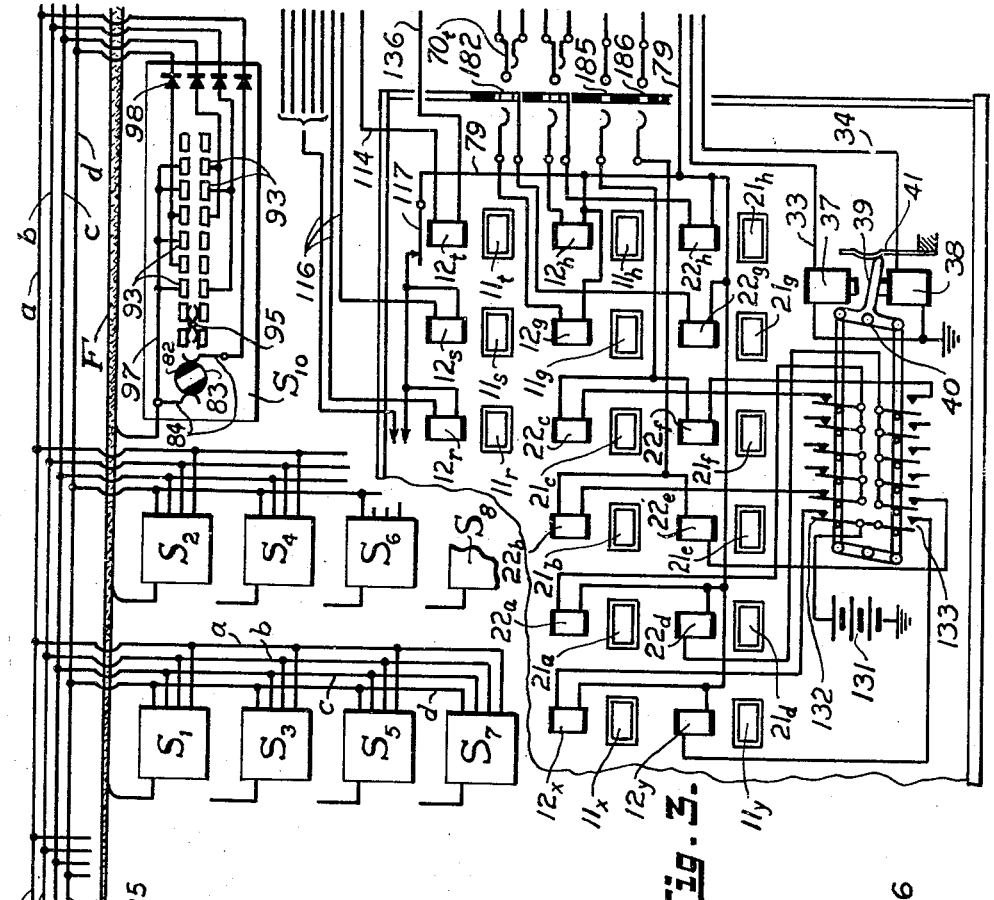
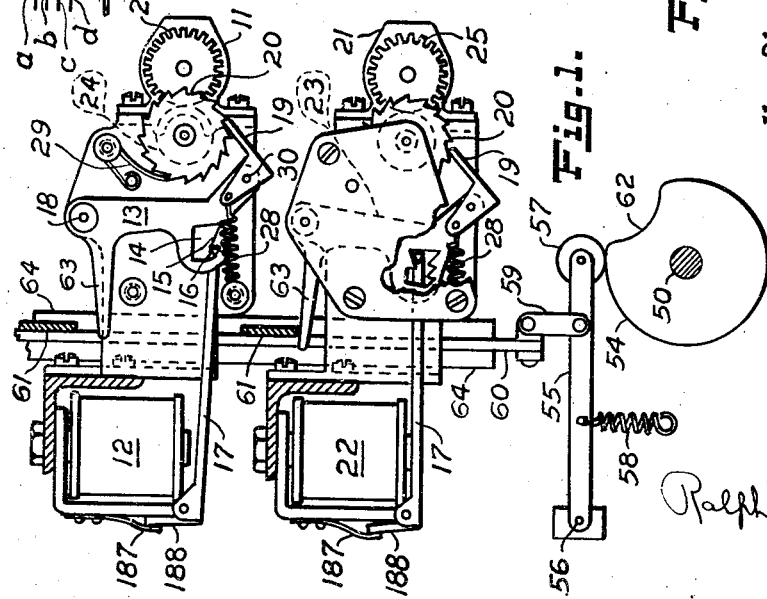

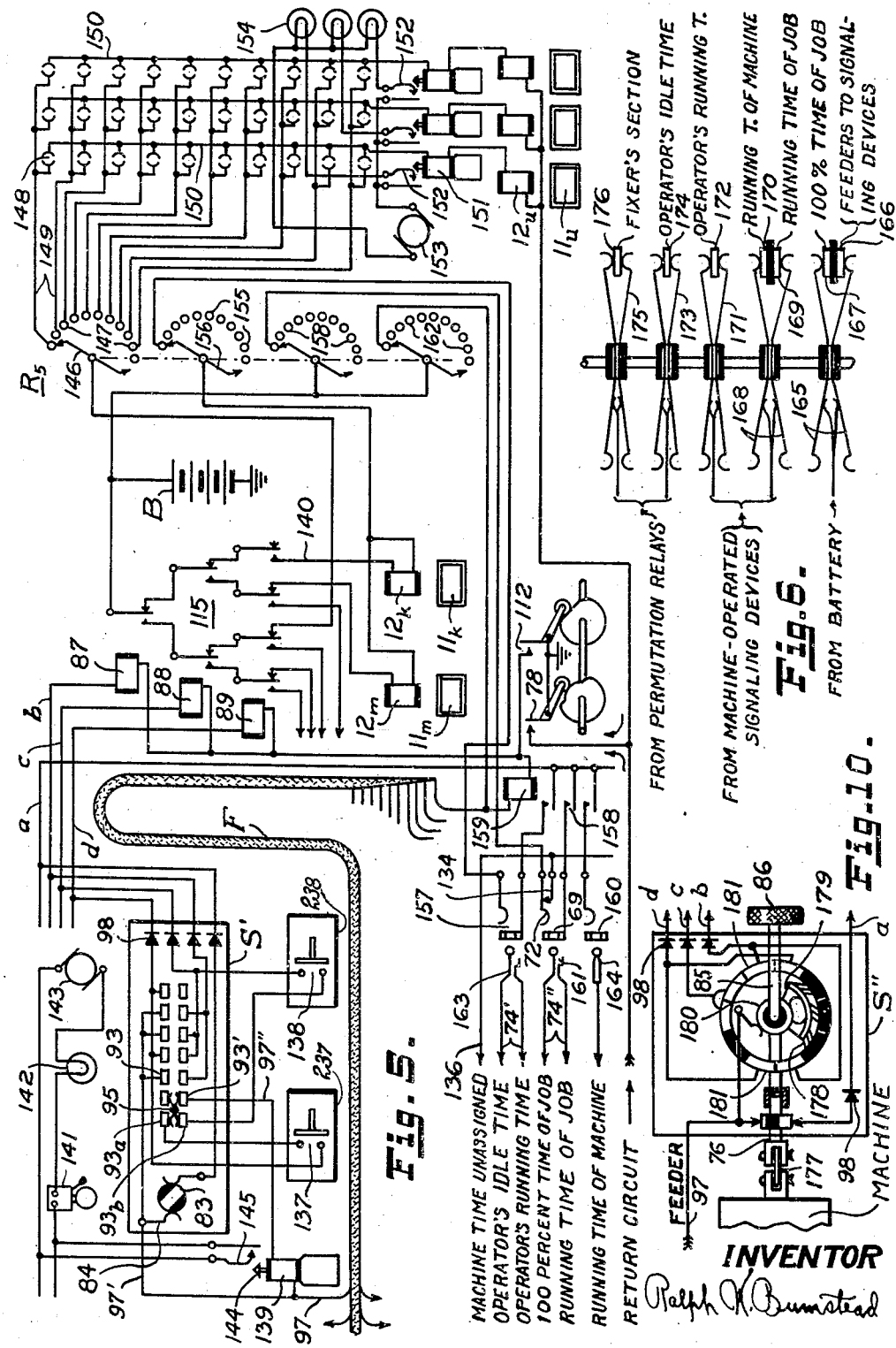

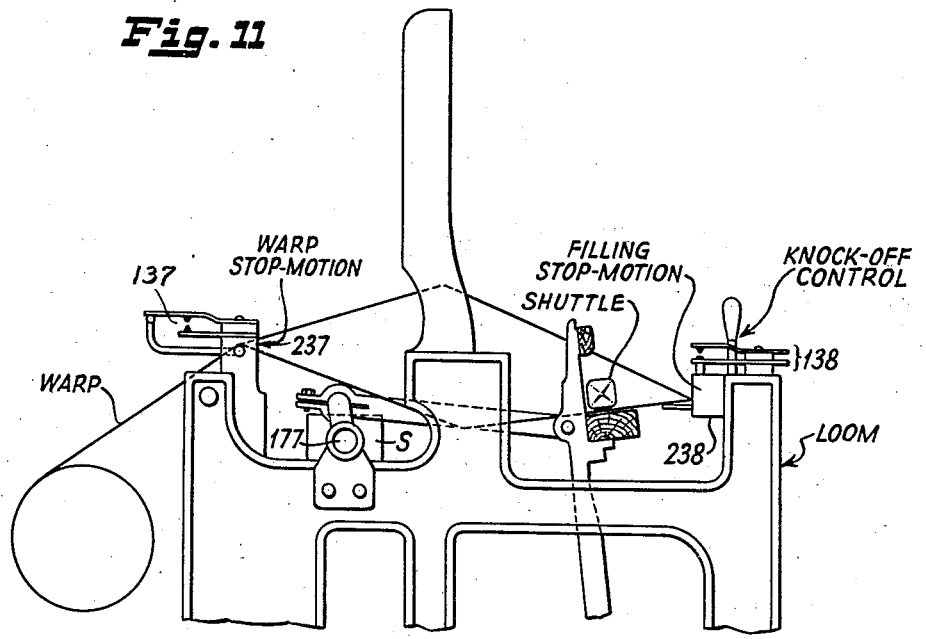
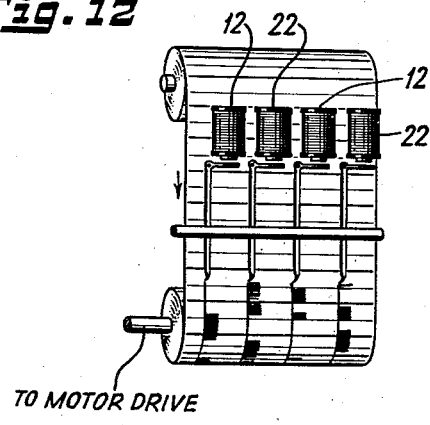

Patented July 16, 1940

2,207,715

UNITED STATES PATENT OFFICE 2,207,715

TELEMETERING AND TABULATING TIMER

Ralph W. Bumstead, Westfield, N. J.

Application July 6, 1934, Serial No. 733,957

24 Claims. (Cl. 235—92)

This invention relates to telemetering and tabulating timers and has particular reference to systems for monitoring the operation of productive machinery in an industrial plant, also for determining and tabulating in condensed form the extent and causes of machine idleness.

In my U. S. Patent No. 1,739,058, granted December 10, 1929. and entitled Elapsed-running-time counter, I disclosed a device for registering the summation of running-time intervals of any number of machines in a group. The direct measurement of idle time was not suggested. No means were shown for obtaining a quantitative analysis of idle time, classified as to causes, nor for simultaneously tabulating the elapsed time in respect to machine groups of the operator's sets and in respect to machine groups classified by kinds of product thereof, or according to any other basis of classification. The present invention, therefore, contemplates making provision for the attainment of these objects.

The science of industrial management clearly points out the advantages to be derived from a close observance of operating conditions in respect to mass production. Where the number of machine units is large, the cost of fact-finding for better control of the operations becomes a serious consideration. Many of the wastes in industry have been tolerated in the past, in some cases, because the cost of personal supervision of all the productive units in the plant seemed to out-weigh the savings to be made, and, in other cases, because no basis was available for fixing the responsibility for certain inefficiencies upon the proper individuals. As a consequence, a lack of co-ordination of efforts of the various workers has at times been manifested, even where it was to the interest of the workers themselves, as well as of the plant owners, that machine idleness be minimized and the rate of production be increased. Under these conditions it is apparent that a machine operator should not be blamed for delays in production assignable to others, as when one or more of his machines are in need of repairs, or when he waits for raw material, and for his finished work to be inspected and removed. The proper individuals to be penalized in such cases are they who failed to do their part. There, again the responsibility may not be theirs, if no notice was given that certain particular machines were in need of their attention.

The difficulties just now recounted are of such proportions in many a plant that automatic and continuous monitoring of all the productive machinery therein is fully warranted, even though the cost and maintenance of the monitoring equipment were found to be considerable. Depending, of course, upon how much room for improvement existed in a particular plant, the tangible savings to be made would usually stand out in conspicuous comparison with the capital invested in the monitoring installation. The improved performance of the productive units and the improved morale of the operatives should be looked upon as a fair return from such invested capital.

My invention in its broad aspects has been discussed in the foregoing preamble. More specifically, it is among the objects of my invention to provide monitoring, signalling, telemetering and tabulating apparatus at least partially under control of a plurality of productive machines in respect to the operation and idleness of which it is desired to accumulate elapsed time registrations.

Another object of my invention is to provide apparatus including a plurality of electrically controlled timing registers conveniently arranged in an instrument panel, and remote control means therefor, located at each of a plurality of machines that are to be continuously monitored during periods of plant operation, the apparatus serving as a system for quantitative analysis and tabulation of results of the operation of the machines with which it is connected.

Another object of my invention is to provide a supervisory control system for aiding an operative who tends a plurality of machines to keep the maximum number of them in operation at all times.

Another object of my invention is to provide a work-and-idleness meter by which a factory supervisor may be kept informed as to the progress of work in his department, and especially that he may be apprised as to the occurrence of conditions which tend to handicap the operatives, so that he may immediately take steps to remedy the matter.

Another object of my invention is to provide a means for determining the relative extent of machine stoppage for various causes.

Another object of my invention is to provide means for tabulating elapsed running-time measurements in respect to various groups of productive machines.

Another object of my invention is to provide a call system for promptly notifying a fixer when repairs are needed in respect to any one or more machines in his section.

Another object of my invention is to provide a system for giving notice of miscellaneous requirements for increasing production, thereby to minimize the time of waiting for raw material, for repair material, and for the inspection and removal of finished goods.

The foregoing and other objects and advantages of my invention are attained by the use of means certain portions of which are well known in the art and other portions of which I have devised to meet the peculiar requirements. The invention itself in its entirety may best be understood from the following detailed description, reference being had to the accompanying drawings in which Fig. 1 is a side elevation view of two of the elapsed time registers and their actuating devices;

Fig. 2 is a front view of one of the registers;

Fig. 3 and Fig. 4 when joined thereto, end to end, constitute a schematic wiring diagram of one embodiment of my invention;

Fig. 5 shows modifications of the wiring diagram to meet certain occasional requirements;

Fig. 6 shows further modifications, particularly with respect to the wiring connections for one of the rotary switches which I prefer to use.

Fig. 7 is a perspective view of a transmitter, or signal box adapted to be attached to a machine (and to be at least partially controlled thereby) for remotely controlling my telemetering system;

Fig. 8 is a cross-sectional view of the transmitter otherwise shown in Fig. 7;

Figs. 9 and 10 show each a different embodiment of manually operated switch, forming part of the transmitter;

Fig. 11 shows schematically a loom to which there is attached the various components of signalling apparatus suitable for transmitting impulses to my monitoring system; and Fig. 12 shows a modified application of my invention for purposes of recording the signals which may be transmitted from different productive units in response to the occurrence of different operating or idleness conditions.

Figure 4:
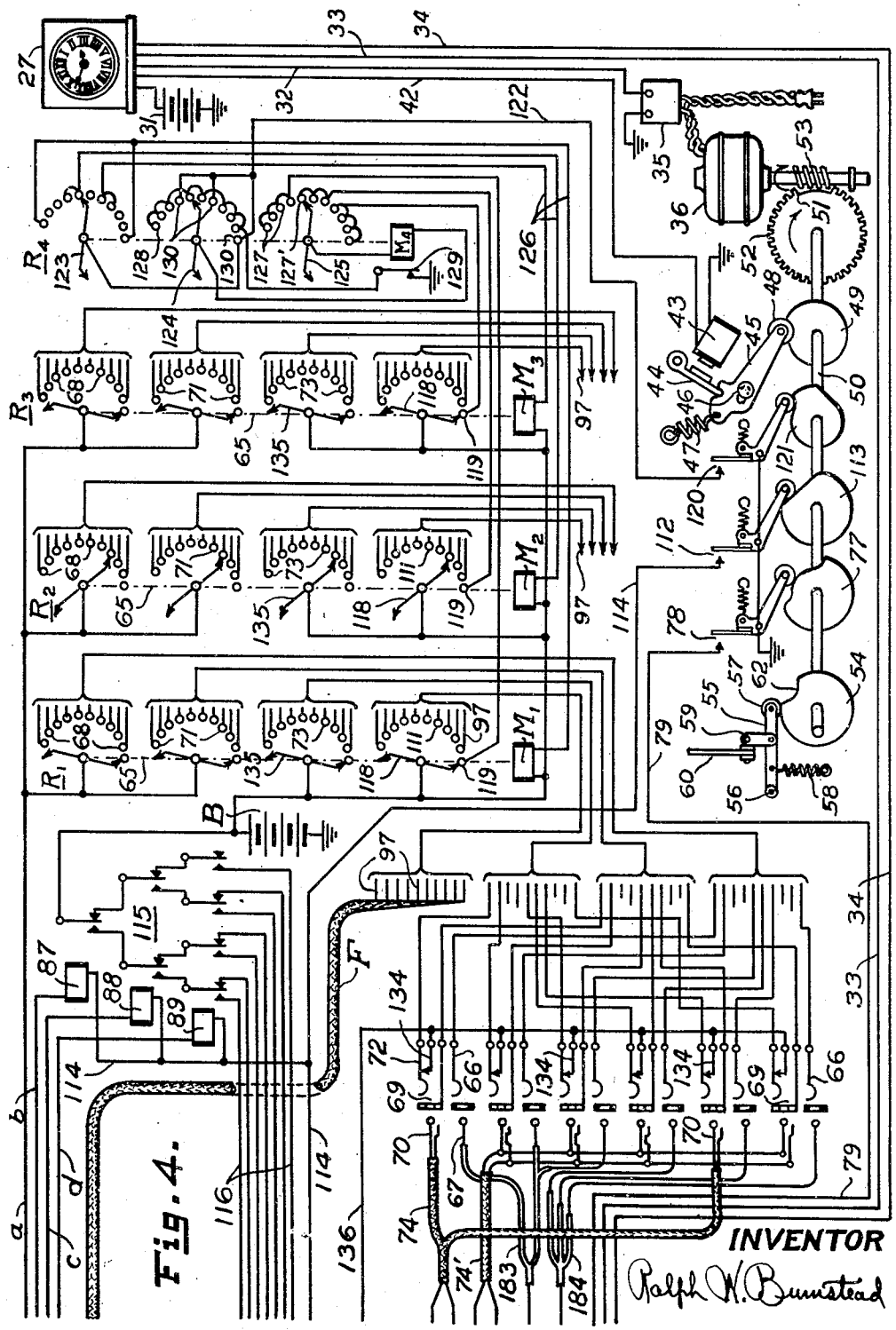

Before describing in detail the various parts of my timing system, it may be well to observe generally that, as shown in Figs. 3 and 4, the system comprehends a number of signalling stations S, each individually associated with a machine whose operation is to be monitored. Like circuit connections exist within each of the signal boxes, hence they have been shown in station S10 as typical. The signal box in its structural details is best shown in Figs. 7, 8 and 9.

In the lower portion of Fig. 3, I show conventionally a number of timing registers assembled into a meter-panel. Structurally each register may be of one or the other of the two types shown in Figs. 1 and 2. Each register is under the joint control of its own actuating magnet 12 and of a mechanical timing motion common to all the registers. This motion is periodic and is preferably driven by a motor through a time-controlled clutch, as shown in the lower part of Fig. 4. A suitable clock 27 is provided for accurately regulating the timing cycles of the system.

Between the signal boxes and the registers is a network (shown for the most part in Fig. 4) including rotary switches, relays and a manually operated cord-and-plug switchboard by which suitable connections may be made so as to bring in signals from only one at a time of the various signal boxes and from each periodically, for actuating selected ones of the group registers and for tabulating the results of the elapsed time measurements according to different classifications. The cord-and-plug connections may be such that when the work on the machines is changed, or when the operator groups are rearranged, the new groupings of the machines may be properly reflected in the tabulative registrations of elapsed running time, etc.

In Fig. 1 I show two timing registers 11 and 21 which, as counters, are similar in every respect, although their electro-magnetic actuating mechanisms differ slightly according to the manner in which they are controlled. While these registers are essentially similar to those shown and described in my aforesaid patent, I have herein disclosed certain improvements of design in the control mechanisms. The upper timing register 11 is best adapted to make idle time accumulations, or else it may have assigned to it a 100% machine hour timing function. The lower timing register 21 is of the type preferred for measuring machine running time.

The register control mechanisms may be released by their respective magnets 12 or 22. The registers 11 and 21 are not advanced, however, until their control mechanisms are restored to normal by one of the periodic excursions of a clock-controlled driving mechanism presently to be described.

The escapement lever 13 has an opening 14 in which there is one tooth 15 for engagement with a dog 16 on the end of the armature arm 17 which is actuated by the magnet 12. The escapement member 13 is pivoted at 18 and carries the pawl 19 which is pivoted on the lever 13 at 30. The pawl 19 engages with a ratchet wheel 20 and a spring 28 urges the pawl 19 against the toothed periphery of the ratchet wheel. The spring 28 also serves to retract the escapement lever 13 when disengaged by the uplifting of the armature 17, as when an impulse energizes the magnet 12. The escapement lever 13 may then be fully retracted and cause the pawl 19 to ride over one tooth of the ratchet wheel 20. This ratchet wheel is restrained by the spring 29 from turning clockwise when the pawl 19 is being retracted. A driving gear 24 is mounted on the same spindle with the ratchet wheel 20 and turns with it. The driven gear 25 meshes with gear 24 and transmits its motion either directly or through a further gear train (not shown) to the drum dials 26, as illustrated in Fig. 2.

The armature 17, when released by its magnet 12, may be caused to drop by gravity, and this motion may, if desired, be accelerated by a spring 187 bearing against a heel portion 188 of the armature 17.

A time-controlled driving mechanism common to all the registers is in part and conventionally shown in Fig. 4. A clock 27 of any desired type has embodied therein a suitable impulsing device and preferably also a program device for starting up and stopping the operation of the entire monitoring system.

The program device is conventionally shown as including the battery 31 and the three circuits 32, 33, and 34. The circuit 32 leads to an on-and-off relay 35 by which the motor 36 is started when factory work commences and is stopped at the shut-down of the factory. If the factory operates on two shifts, circuits 33 and 34 of the program device may be used for switching from one set of timing registers to another according to the tending of the machines by one or another shift of the operators. The switching of circuits for this purpose is accomplished by the magnets 37 and 38 as shown in Fig. 3. The common armature 39 pivoted at 40 may be attracted to the pole of either of the magnets. When such a movement has been completed the armature 39 may be held by the spring 41 in either position. During the period of day-shift operation this armature may be positioned as shown in the figure and the closing of circuits including magnets for the timing registers 21a, 21b, 21c, and the like will be permitted. However, when the magnet 37 is energized at the moment of changing shifts all of these circuits are broken and other circuits leading to the timing registers 21d, 21e, 21f and the like will become operable during the night shift.

If the factory operates on three shifts, it would be a simple expedient to provide a separate group of operators' registers for each shift and to arrange that the program device in the clock 27 would selectively close each of three multipole-single-throw switches in place of the double-throw switch operated by magnets 37 and 38.

During mill hours the clock 27 is caused to send out periodic impulses on circuit 42 at a suitable rate for starting each cycle of operations to be performed by the motor 36. The clutch mechanism for engaging the motor 36 with its load is as follows: Periodic impulses are fed from the battery 31 through the clock impulsing device (not shown because conventional) through conductor 42 to the magnet 43 and thence to ground. Armature 44 engages with a member 45 which is supported by the pivot stud 46, the latter passing through an elongated hole so as to permit of a slight longitudinal movement of the member 45. Upon the energization of magnet 43, its armature 44 is caused to longitudinally shift the lever arm 45 against a tension of the spring 47, thereby to drive the roller 48 against a steep walled depression in the periphery of the cam 49. This cam is fixed to the shaft 50. The shaft is, therefore, turned through a slight angle, in a clockwise direction, thus urging a tooth 51 of the worm wheel 52 into mesh with the worm 53. The motor 36 drives the worm continuously but the worm wheel 52, having a cut-away sector, is held out of mesh until the aforesaid starting movement takes place.

The motor 36 then carries the worm wheel 51 and a number of cams fixedly mounted on the shaft 50 through one complete revolution. In this manner various operations are cyclically performed in proper sequence for actuating my entire timing system. One of these operations, namely the stepping forward of selected registers whose control mechanisms have been released is accomplished by the cam 54 with which a lever arm 55 pivoted at 56 and having a roller 57 for engagement with said cam, is caused to convey a downward movement to the device for driving the registers and re-setting their control mechanisms. The roller 57 is urged against the cam 54 by the tension of a spring 58. A connecting link 59 communicates the motion of the lever arm 55 to a register driving member or frame 60 shown both in Fig. 4 and in Fig. 1. This frame 60 may be vertically disposed in runways provided by the guide bars 64 on the two sides of the register panel. Forming part of the frame 60 is a plurality of horizontal cross bars 61, which are so positioned that they may be simultaneously lowered at the time of rotating the cam 54 to the point where the roller 57 drops into a depression 62. By such lowering movement the cross bars 61 come into engagement with the detents 63 which are integral with the escapement lever members 13 and 23.

Such escapement lever members therefore, as have been released by the operation of their associated armatures 17 will be restored to the normal position. In the drawings, member 23 is shown as having been released while member 13 is shown as having been restored. This restoring movement is timed to take place after the magnets 12 and/or 22 have been de-energized. Hence, the armature 17 will fall back into the recess behind the tooth 15 and the forward movement of the escapement lever 13 will have caused the pawl 19 to rotate the ratchet wheel 20 through an angle subtended by one tooth.

As will presently be shown in describing the circuit arrangements of this invention, means are provided whereby the control magnet for any particular register is connected to the signalling stations of different machines successively and to each such signalling station periodically. The impulses which are caused to actuate the register actuating magnets are, therefore, derived from only one signalling station at a time. The accumulative effect of such impulsing is, however, to integrate the elapsed time intervals in respect to all of the machines which are to be monitored.

Any suitable gear ratio may be provided by the gears 24 and 25 such that if it is desired to indicate elapsed time in terms of hours and tenths of hours, or in any other units, then the intermittent movement of the ratchet wheel 20 will effect the proper advancement of the dials 26, for that purpose. If, for example, register 11 is allotted to the function of maintaining an idle time accumulation with respect to thirty machines, the idleness of one machine for thirty minutes will advance the counter just as much as would the idleness of all machines for one minute. In either case there would be a half hour of machine idleness to be registered or recorded. Assuming that each of the thirty machines can be monitored once every minute, then the magnet 12 may be adapted to pull up its armature 17 a maximum of thirty times per minute, or once each minute for each machine. Each release of the escapement lever 13 will then cause the advancement of the register dial 26 to register one minute of elapsed time, which would be ⅙ of the arc subtended by one figure on the drum of the lowest order, since the figures of that drum represent tenths of hours, or 6-minute periods.

Within reasonable limits, the actual machine running time may be accumulated on a register 21 with respect to any number of machines. The actuating mechanism for this register, as previously intimated, differs from that of the register 11 in that its escapement lever is provided with an orifice having three teeth, two in the lower jaw and one in the upper. The purpose of this arrangement is to prevent the full retraction of the pawl 19 over one tooth of the ratchet wheel 20 until the second of an indeterminate number of impulses for energizing the magnet within one of the periodic timing cycles has been received. My aforesaid patent discloses the advantage of actuating a running-time register upon reception of the second impulse.

The impulses impressed upon the magnet 22 according to the present system, as well as in the system of my prior patent, are derived from a make-and-break device connected with each machine. It is necessary to differentiate between a running machine and one which might be stopped with its make-and-break device in the "make" position. Since the first impulse is meaningless by itself, and since there would be no object in controlling the actuation of the register by impulses following the second impulse in any one timing cycle, it is obvious why I have chosen to fully retract the escapement member 23 by two complete excursions of the armature 17 of magnet 22.

The control mechanism for the register 21 has been shown with the actuating lever 23 in the position it would occupy when the magnet has been energized for the second time within one timing cycle. The armature 17 is shown attracted to the magnet 22. This means that the detent on the end thereof has permitted the escapement of each of the three teeth and is now ready to drop back, upon the cessation of the second impulse. The lever 23 has, therefore, reached its limiting position, as shown, by three steps, one of which was taken when the magnet 12 was energized for the first time, the second step when it was released, and the third step when it was energized for the second time.

If, during a timing cycle, the magnet 22 is energized and released only once, the partial retraction of the escapement lever 23 would be insufficient for the pawl 19 to ride over a tooth of the ratchet wheel 20. Hence no advancement of the register would be possible in this case. The restoring movement of the cross bar 61 would merely re-set the escapement lever and restore the pawl 19 to its original position without movement of the ratchet wheel 20. The single impulse for partial retraction of the escapement lever arm would, therefore, be just as ineffective as though no impulse had been received.

It can readily be provided that the periodicity of the impulses applied to the magnet 22 will bear such a relation to the timing cycle that there will never be less than two such impulses received during the time that the magnet 22 is connected with the make-and-break device of a given running machine. Hence, the advancement of the register will be such as to correctly indicate the elapsed running time of the machine to which it is connected.

Referring now to Figs. 3 and 4, I have shown certain switching means by which signals may be initiated successively and in rotation from each of the transmitting stations S, and thence directed through suitable channels for controlling the timing registers selectively. The embodiment illustrated includes three similar rotary switches, $R_1$, $R_2$, and $R_3$, each switch having four banks of contact segments. The rotary contact members or wipers of the four banks are to be understood as mounted upon one shaft 65 of each switch. Such wipers are rotated as a unit by means of a magnetic driving mechanism, operated step-by-step. Switches of this type are commonly used in automatic telephone exchanges and the details of their construction form no part of the present invention. In accordance with my invention, however, it is possible to use switches of this type, first for connecting the battery B with each of the transmitting stations S successively, and while so doing, to distribute the running time signals as transmitted from the several stations to the timing registers selectively in accordance with any desired statistical classification of elapsed time integrations. Thus, from the upper level of the switches, running-time signals transmitted over the conductor $a$ may be distributed say in accordance with the grouping of machines under an "operator" classification, so that if, for example, an operator tends four machines, the signals from the four stations $S_1$, $S_2$, $S_3$, and $S_4$ of his set will all be assigned to a single running-time register $21_b$.

In order to facilitate the selection of machines to be comprehended within each group, it is desirable to provide a cord-and-jack switchboard such as represented in the lower left portion of Fig. 4. As therein shown, there is a jack 66 suitable for a single conductor plug 67. Each jack 66 may be identified with its respective machine transmitter $S_1$, $S_2$, etc. to which it will be connected periodically through an appropriate segment 68 in the upper bank of one of the rotary switches.

The manual switchboard also includes jacks 69 each suitable for a twin-conductor cord and plug 70. I have here represented a plug for one of these cords as having a sleeve connecting with the body of the jack 69, which in turn is wired to one of the segments 71 on the banks second from the tops of the rotary switches. The wipers for the first and second banks are connected in parallel and hence receive the same signals. This two-way distribution of signals is made in order that the machine running-time be integrated in accordance with two different classifications or groupings of the machines. The tip of the plug 70, connects with the jack spring 72. Each of the latter is wired to its respective segment 73 on the third banks of the rotary switches. The wiper for the third bank is fed with current from the battery B and hence a periodic distribution of impulses is made to the respective cord tips. The purpose of making this periodic distribution of single impulses along with the reception of running-time signals is to provide a comparison between a 100% registration of machine hours for a predetermined group of machines (comprehending any desired number thereof) and, on the other hand, a registration of actual running machine hours, as determined by the reception of running-time signals from the same group of machines.

To illustrate how connections may be made from a multiplicity of jacks 69 to a single pair of register magnets $12_g$ and $22_g$, I have indicated a forked twin-conductor cord 74 having a plug 70 at each of its branch terminals and a plug $70_t$ at its trunk terminal. The cord 74 may, for example, convey impulses from tip to tip and through jack 182 to magnet $12_g$ for integrating the 100% machine hours in respect to machines of stations $S_1$ and $S_7$. The same cord 74 conveys running-time signals from stations $S_1$ and $S_7$ through the sleeves of its plugs 70 and $70_t$ to magnet $22_g$. The machines to which stations $S_1$ and $S_7$ are connected may be assumed to be producing style X.

Style Y may be the product of certain machines with which stations $S_2$, $S_5$, $S_6$ and $S_{10}$ are associated. Then cord 74' having four branches may be used to properly connect the magnets $12_h$ and $22_h$ each to its respective signaling channel or group of channels.

I have shown illustratively certain concentrations of signaling circuits suitable for tabulation of the machine running-time by operators' sets. One group comprises jacks 66 for stations $S_1$, $S_2$ and $S_5$ from which the forked single-conductor cord 183 establishes connection with jack 185 for day-shift register 21c, also for night-shift register 21f. The other group comprises jacks for stations S6, S7 and S10 from which the forked single-conductor cord 184 establishes connection with jack 186 for day-shift register 21b, also for night-shift register 21e. Thus the actuating magnets 22 for each of these registers are caused to respond to signals from the stations of each operator's group during his respective shift.

The concentration of circuits between a multiplicity of jacks 69 and one register jack 182 may be facilitated by the use of intermediate jacks (not shown) having corresponding terminals interconnected. Thus, several cords 74 may have their trunk-end terminals connected in parallel. A simple cord-and-plug connection may then be made between one of the interconnected intermediate jacks and a register jack 182. Other concentration facilities may also suggest themselves to those skilled in the switchboard art.

Referring to Fig. 7, which is a perspective view of a preferred embodiment of my signal transmitting device S, I have provided a commutator switch or circuit interrupter mounted on a shaft 76 which is connected to an operative machine in any suitable manner. The machine itself does not appear in this view but has been conventionally shown in Fig. 10. Preferably the shaft 76 is positioned co-axially with any rotating shaft on the machine so that it will rotate and stop in accordance with the running and stoppage of the machine. Within quite wide limits, the speed of the shaft on the machine to which my transmitter shaft 76 is linked is of no importance. It is essential, however, that when the machine is running, the commutator switch be capable of delivering a plurality of impulses to a register actuating magnet 22 within a signalling time interval whose duration is determined by the cam 77 (Fig. 4), that is to say, while the contacts 78 are caused to ground the conductor 79.

Bearings for the shaft 76 are provided by the left side-wall of the casing, also by a post 80. Mounted on the shaft 76 is a commutator which comprises preferably a metallic member 81 insulated from the shaft by the sleeve 82 and having interconnected contact segments 83 interspaced with insulating material. Two brushes 84 bear against the cylindrical surface of the commutator. The metallic segments 83, being interconnected, are adapted by rotation to bridge the brushes 84 intermittently.

Usually it is desirable to transmit two impulses with every complete revolution of the shaft 76. This is accomplished when there are but two contact segments 83 opposing one another and when the brushes 84 bear against opposite sides of the cylindrical walls, as shown. Impulses may, however, be transmitted at the rate of one per revolution of the shaft 76, provided the two brushes bear against the same side of the commutator cylinder, the latter in this case, having only one metallic segment 83. If the speed of the shaft 76 is so slow that it is desired to multiply the number of impulses per revolution, then as many opposing metallic segments 83 as are suitable may be disposed peripherally of the commutator.

A manually operated shaft 85 having a control knob 86 is mounted co-axially with the shaft 76. This shaft carries and operates switching mechanism by which permutational signals may be set up for intermittent and periodic transmission, indicative of idle-time conditions with respect to the machine to be monitored. As will later be shown, these signals are transmittable only when a machine is stopped. They are directed through conductors b, c and d (Figs. 3 and 4) for controlling selector relays 87, 88 and 89, respectively, whereby the actuation of various timing registers (and annunciators, if desired) is effected.

In order to compare the actual number of revolutions of a machine with the elapsed running-time thereof for a given period, and thus to obtain the effective average speed of the machine, I have provided a revolution counter 90 the driven gear 91 of which meshes with a driving gear 92 mounted on the shaft 76. The units-dial of the register 90 may, if desired, be so connected with the driven gear 91 that it will count in some multiple of single revolutions.

In the manually controlled switch shown in Fig. 7, there are two banks of contact-segments 93, each bank being mounted on an insulation disk 94. Interposed between the two banks is a pair of wipers 95, the form of which may preferably be somewhat as shown in Fig. 9. The fingers 96 are made of resilient material so that when selectively positioned by the rotation of the knob 86, any four adjacent segments (two in each bank) may be electrically interconnected. The wipers 95 are insulated from the shaft 85.

Fig. 3 shows diagrammatically one arrangement of electrical connections to the segments 93. The pair of wipers 95 is shown in the home position where no idle time signal is transmittable because the machine to which the transmitter is connected is assumed to be running. Since the knob 86 may be rotated to advance the wipers successively over different segments 93, it will be seen that a current when fed to the conductor 97 can be communicated simultaneously through the segments with which the wipers are in contact and back to the central station over any or all of the conductors b, c and d. In this manner permutational signals indicative of certain machine idleness causes may be transmitted and caused to actuate relays 87, 88 and 89 in any one of seven different combinations.

Any number of transmitting stations S may be served by a common wiring system comprising the conductors a, b, c and d, provided means are employed such that signalling currents may be transmitted unidirectionally through one transmitter at a time and without the possibility of "backing up" through other transmitters so as to confuse the signals. Accordingly I prefer to employ unidirectional devices at each transmitting station consisting of metal-oxide rectifiers 98. One of these rectifiers is placed in each of the output leads connecting with the common conductors a, b, c and d. As shown in Fig. 7, each rectifier unit may consist of a number of series-connected plates r, and the end-plates of each unit may be provided with terminals 99. Insulation members 189 are, of course, inserted between the plates of electrically independent rectifiers. If desired, all rectifiers 98 may be supported by and insulated from one stud 100.

An indicating dial or drum 101 having peripheral designations 102 enables the operator to set the knob 86 intelligently for transmitting any desired signal. The dial and the switch are turned as a unit whenever the operator finds his machine to be in need of attention by someone other than himself. The dial indications are visible through the window 103 in the cover of the signal box.

A transmitter such as shown in Figs. 3 and 7 is adapted to transmit running-time signals over the conductor $a$ and to utilize conductors $b$, $c$ and $d$ for transmitting permutationally any one of seven idle-time signals. If a fourth conductor were to be provided for the permutational signals, then as many as fifteen such signals could be differentiated. A choice of only three permutations would be possible, however, if conductor $d$ were to be omitted.

I have provided a clutch arrangement interconnecting the shafts 76 and 85 so that the manually operable switch may be automatically restored to a homing position whenever the machine is again started after a period of idleness. The clutch comprises a dog member 104 mounted on a pivot pin 105 which, in turn, is supported by the hub member 106, the latter being fastened to the end of the shaft 85. A notch 107 is cut in the shaft 76 and is so positioned that as the shaft 76 rotates, the dog member 104 engages therein, being constantly urged against the shaft by the spring 110. Hence the machine, when it starts, rotates both shafts 76 and 85 until the latter reaches a homing position. A detent 108 on the end of the dog member 104 then strikes an adjustable stud 109 in the bottom of the casing, thus disengaging the dog 104 from the notch 107. The shaft 76 then continues to rotate under control of the machine as long as the machine operates, whereas the shaft 85, bearing the idle-time signalling switch and dial 101, remains stationary until re-set manually.

Only one of the stations S is enabled to transmit signals during a given timing cycle. Each successive timing cycle is, however, allotted to a different station in rotation. The means for doing this includes wipers 118 and contact segments 111 of the rotary switches $R_1$, $R_2$, and $R_3$ (Fig. 4). Through any one of the segments 111 and an individual conductor 97 connected thereto current may be fed from the battery B to a particular signal box S where the conditions to be monitored are duly translated into code signals, the latter being returnd to the central station over any of the conductors $a$, $b$ $c$ and $d$. If desired, the wires 97 may be formed into one or more transmission cables F for at least part of their lengths.

In order to illustrate only one out of numerous practical applications of my invention, I have chosen for consideration the operating conditions in a weave room of a textile mill. Possibly the most prevalent causes of loom idleness are those which are designated in the following table, and in addition, the stoppages due to breakage of the warp threads and filling threads. Since the weaver is responsible for piecing up the thread breaks, he cannot call for help as when other causes of idleness occur:

| Manual switch position | Signal circuit energized | Relays actuated | | | Idle-time designations or call for assistance |
|---|---|---|---|---|---|
| 1 (Home) | $a$ | .. | .. | .. | (Machine running). |
| 2 | $b$ | 87 | .. | .. | Fixer. |
| 3 | $bd$ | 87 | .. | 89 | Web twister. |
| 4 | $d$ | .. | .. | 89 | Cloth taker. |
| 5 | $cd$ | .. | 88 | 89 | Warp out. |
| 6 | $bcd$ | 87 | 88 | 89 | Repair material wait. |
| 7 | $bc$ | 87 | 88 | .. | Filling out. |
| 8 | $c$ | .. | 88 | .. | Smash. |

As long as an idle-time switch remains set to a given signalling position, the periodic supply of current thereto from battery B through one of the segments 111 and the corresponding conductor 97 will permit signals to be transmitted to the relays 87, 88 and 89 as selected. These relays may be repeatedly energized and each time for only a portion of the timing cycle. Their common return circuit 114 is grounded in response to the operation of the cam 113 acting upon the contacts 112. The peripheral contour of this cam is such that the circuit remains open while any one of the rotary switches $R_1$, $R_2$, and $R_3$ is being stepped along, thus avoiding an objectionable arcing between the rotary switch wipers and their segments.

The circuits selectively established by the relays 87, 88 and 89 when working in different combinations are seven in number; hence current may be fed from battery B through the so-called "Christmas tree" arrangement of relay contact spring 115 to any of the conductors 116 and thence to an idle-time register magnet such as $12_r$ or $12_s$. Each impulse impressed upon the actuating magnet 12 (Fig. 1) for such a register will release the same for a forward step indicative of an elapsed time interval of the same duration as exists between successive feedings of current to the particular transmitting station S under discussion.

The impulse applied to a magnet 12 is of shorter duration than that for holding the relays 87, 88 and 89 energized. This is accomplished by making a common return circuit to ground from magnets 12 through normally close contacts 117 of magnet $12_t$, through conductor 79, and through the cam-operated contacts 78. The cam contours are such that contacts 112 close before and open after contacts 78 close and open, respectively.

Since each idle-time registration is made within a unitary timing cycle (or single revolution of the cam-shaft 50), and since successive timing cycles are allotted each to a different station S, it will be clear that any number of different settings of the idle-time switches in respectively different signal boxes may be provided for to control the idle-time registers without mutual conflict.

Fig. 4 illustrates one solution of a problem encountered in the extension of my system so as to comprehend the monitoring of a large number of machines. I have found that my meter panels may conveniently be built to accommodate multiples of ten machines and also multiples of twenty-four. The meter panels may be located centrally of any machine group which is to be monitored, in order that the distances covered by the transmission lines may be minimized.

The drawings show, merely for purposes of illustration, how I would employ three rotary switches $R_1$, $R_2$ and $R_3$ each to serve the signaling requirements of ten stations S. The rotary switches shown have eleven segments in a bank. In one position no station S is connected, but when a wiper 118 (say of switch $R_1$) steps onto the last segment 119 (its homing position), its motor magnet $M_1$ will be disabled while the other rotary switches are caused in succession to rotate their wipers.

In the smaller installations these 11-position switches may be useful. If three such switches are installed in a single meter panel, then the panel capacity will be such as to serve thirty stations S. However, rotary switches having twenty-five segments in a bank are commercially available. These are generally preferable to the switches shown in the drawings. Schematically, the circuit and switching arrangements will be understood to be the same regardless of the number of segments in a bank and regardless of the number of rotary switches to be operated successively.

An impulsing device for actuating the motor magnets $M_1$, $M_2$ and $M_3$ is provided in the common circuit 122 and takes the form of grounding contacts 120 under control of the cam 121. The switches are preferably of the type that advance their wipers when the motor-magnet de-energizes. Hence the opening of the contacts 120 is synchronized with the register driving motion as controlled by the cam 54. At the same time contacts 112 and 78 will be open so that no relay action or register action can take place.

Each of the motor magnets $M_1$, $M_2$, and $M_3$ is connected with the battery B and has an individual control circuit 126 leading to segments on the upper bank of an auxiliary switch $R_4$. The position occupied by the wiper 123 determines which of the motor magnets $M_1$, $M_2$, or $M_3$ will be operative. In the drawings all wipers are viewed as though they rotated clockwise. The last segment to be reached is, therefore, indicated at the bottom. The segment 119, instead of functioning to select a station S, will transmit current to one of the segments 127 on the lowest bank of the switch $R_4$, thereby energizing its motor magnet $M_4$. The return circuit passes through the wiper 124 of the middle contact bank. Some of the segments 128 of this bank are connected with the automatically grounded circuit-breaker 129. The operation under this condition is, therefore, to advance the rotary switch $R_4$ until the wiper 124 reaches one of the contacts 130, where it is momentarily arrested because these contacts are wired in multiple to the cam-operated grounding contacts 120. Rotary switch $R_4$ then awaits the next periodic closing of the contacts 120, when it takes one further step in synchronism with an initial step made by one of the rotary switches $R_1$, $R_2$ or $R_3$, depending upon which of the latter is in line for advancement.

Let it be assumed that the magnets $M_2$ and $M_4$ were thus energized and released, simultaneously. Rotary switch $R_4$ will now be positioned so that its wiper 125 is in contact with segment 127' which has no immediate battery connection because current can only be fed to it (through segment 119) when the rotary switch $R_2$ arrives at its homing position. This chain of operations enables the rotary switch $R_2$ to make a complete excursion step-by-step over its segments.

Referring again to Fig. 3, I have shown, merely for purposes of illustration, two registers $21_g$ and $21_h$ which may be assigned to the function of accumulating machine running time by styles, and two associated registers $11_g$ and $11_h$ for indicating 100% machine time according to the same style-group. I have also shown two registers $21_b$ and $21_c$ each of which is assigned to an operator group for the day shift and two similar registers $21_e$ and $21_f$ each assigned to an operator group for the night shift. The alternate connection of the day and night shift registers under control of the clock-actuated magnets 37—38 has been explained in the foregoing description.

For convenience in comparing the overall efficiency of the day shift and the night shift, I may employ two registers $21_a$ and $21_d$. One of these registers, $21_a$ is connected in the return circuit from the entire set of registers for the day-shift operators. The other register is correspondingly connected in the return circuit from the night-shift registers.

For further convenience in comparing all registrations of running time and idle time with previously determined standards for any period, I may provide two registers $11_x$ and $11_y$, one for the day shift and one for the night shift, merely as timing registers. That is to say, one of these registers will receive an impulse from the battery 131 with every cyclic impulse from the clock. The transfer of control from one register to the other at the change of shifts is a function of the previously described double-throw switch, including contacts 132 and 133. Contacts 132 are in circuit with the register-actuating magnet $12_x$. Contacts 133 are in circuit with the register-actuating magnet $12_y$. The impulses for advancing these registers are provided by the closing of the grounding contacts 78. Hence, the hours, say, from the starting up of the mill on Monday morning, up until any hour of operation of a day shift or night shift (exclusive of lunch hours) and on any day of the week may be indicated as a 100% elapsed time registration. With this 100% accumulation all registrations of elapsed running time and elapsed idle time, as denoted by the other registers, may be compared.

If it is desired to make separate registrations of idle-time for the day shift and for the night shift, such can readily be accomplished. In this case, the return circuits from the day-shift idle-time registers would be brought individually to the multiple contacts on one side of a double-throw switch such as that shown in Fig. 3, while the return circuits from the night-shift registers would be oppositely disposed.

It is often times desirable that a record be kept of elapsed idle-time due to curtailment of the production schedules when there is lack of business for operating the plant on a 100% capacity basis. To meet this need I provide an idle-time register $11_t$, which will accumulate the lost machine hours in respect to machines to which no work is assigned. This idle-time register differs from the other idle time registers only in respect to the addition of a pair of circuit breaking contacts 117 controlled from the armature of the register actuating magnet $12_t$. The purpose of the circuit breaking contacts is to disable all other idle-time registers when the "idle capacity" register is being operated. This arrangement is provided as a safeguard lest when machines are left unattended their manual switches should be carelessly or mischievously thrown into an operating position and thus destroy the accuracy of the idle-time registrations for other machines of the same group. It is to the machine operator's interest to obtain credit for the maximum percentage of running-time and to set the knob 86 to an idle time designation only when assistance is called for. Hence, for machines that are under an operator's control, there is practically no danger that false idle-time signals would be transmitted.

The control circuit for the idle-capacity timing register $11_t$ includes a multiple arrangement of back contacts 134, each associated with a tip contact 72 of one of the jacks 69, as shown in Fig. 4. With respect to any one of these jacks current is fed to the tip contact 72 from battery B; through a wiper 135 and segment 73 belonging to one of the rotary switches $R_1$, $R_2$, and $R_3$. During a complete cycle covering the testing of all the machines to be monitored, each tip contact 72 of the jacks receives one impulse. If a plug is inserted in the jack this impulse operates a 100% timing register (such as $11_g$ or $11_h$) denoting the machine hours available for each job or kind of production. If no plug is inserted in the jack, contact will be made between the two springs 72 and 134, whereby the impulse is directed through conductor 136 to the actuating magnet 12t for the idle capacity timing register 11t. The return circuit 114 from the magnet 12t leads to the cam-operated grounding contacts 112 which are closed simultaneously for this magnet and for the relays 87, 88 and 89. From this it will be seen that at each position occupied by one of the wipers 135 of the rotary switches a certain jack will be selected. If a plug 70 has been inserted therein for timing and tabulating the machine operation by job groups, the 100% time registration will be made, but if no plug is inserted in the jack, the idle capacity register will be actuated. The total hours for the assigned machines as registered on the various 100% registers 11g, 11h, etc. plus the total of idle-hours as registered on the idle capacity register 11t will, therefore, give a grand total of machine hours for the machines that are monitored during any given period.

Referring now to Fig. 5, I show a modification of my invention. There are many instances where productive machines are provided with automatic devices, commonly called "stop-motion." If anything goes wrong with the automatic mechanisms of the machine itself or in case of defects in the material that is being processed, it is the function of the "stop-motion" device to stop the machine as quickly as possible, thereby to prevent damage either to the machine as quickly as possible, thereby to prevent damage either to the machine or to the product. An automatic loom presents perhaps as good an example as is needed to make this point clear. Present day looms are usually equipped with warp stop-motions and filling stop-motion. As an example of a warp stop-motion, reference is made to U. S. Patent No. 1,265,112 to Regan, dated May 7, 1918. A filling stop-motion is shown in U. S. Patent No. 1,353,824 to Finn, dated September 28, 1920. Stop-motions for other types of machines are well known. As an example thereof, the stop-motion device for a knitting machine may be mentioned as shown in U. S. Patent No. 1,342,245 to Ames, dated June 1, 1920. It is typical of these stop-motion devices that when anything goes wrong with the functioning of the machine or with the feeding of the material in process, a mechanical movement takes place such as to throw the shipper-handle or driving control member into position for cutting off the motive power and for stopping the machine.

Thus, if a warp-thread breaks, a certain designated mechanism is brought into play which causes the loom to stop. The same thing occurs but in a different manner if the thread trailed by the shuttle happens to break. In such instances it may be desirable to register the time of machine idleness from the moment the machine stops until it is again put into operation by the operator. Furthermore, it is desirable to know which is the chief offender in pulling down the efficiency,—the breakage of warp or the breakage of filling.

In order to meet the conditions just described, I have shown a modification of my invention in which certain portions of Fig. 3 and Fig. 4 are either duplicated or the structural parts thereof are indicated without more than an abbreviated representation in Fig. 5. Like parts have been given corresponding reference numerals and characters. I provide signalling circuits, one of which may be closed by the operation of a switch 137 which may be understood to be connected to one of the stop motions 237 on the machine, the other circuit being similarly closed by a switch 138 connected with another of the stop motions 238 on the machine. Current is fed through the cable to these switches intermittently in accordance with the successive selection of different signalling stations S, as previously described in connection with Figs. 3 and 4. In the drawings, block diagrams have been used to represent the stop-motion devices because, as is well known in the art, such stop-motion devices vary a great deal in their structural arrangements, and applicant does not need to be limited to any particular structural features of these devices so long as he utilizes any convenient mechanical motion thereof for actuating the switches 137 and 138.

It is obvious that contacts of a switching arrangement may be closed by any convenient relative movement between different parts of a mechanism such as a stop-motion. All that is necessary is to mount one of the contact elements on a stationary support and preferably insulated therefrom and to mount the other contact element through which the circuit is to be closed on a portion of the mechanism which moves in response to the occurrence of a given condition. Thus, in the case of the operation of a stop-motion on a loom there are certain elements which are displaced by breakage of threads in the material under process. When mounting one of a pair of contact springs on such a displaceable element this contact spring can be caused to engage with a stationarily mounted contact spring thereby to close any circuit such as shown leading to one of the switches 137 or 138.

As shown in the diagram, the individual conductor 97' feeds directly to certain of the contact elements 93 in the signal box S'. A branch 97'' feeds through a dash-pot relay 139 to a contact 93' with which the brush 95 is engaged when in the home position as occupied when the associated machine is running. During intervals of running time the rotating commutator 83 will transmit signals to the proper running-time register-actuating magnets 21, as hereinbefore described. When, however, the machine stops and, for example, the switch 137 is closed by its stop-motion 237, an impulse will be transmitted through the contact segments 93' and 93a, the switch 137 and conductor d, thereby actuating relay 89 to select a circuit 140 which leads to actuating magnet 12k for a register 11k designating idle-time due to this particular kind of stoppage. A similar registration of idle-time due to the operation of a different stop motion 238 may be made as when the switch 138 is closed, thereby feeding impulses through the contact segments 93'—93b, and thence through said switch to the conductor c which actuates relay 88 for selection of the actuating magnet 12m of register 11m. In this manner two of the seven available permutations of signals are transmittable when the brush 95 occupies the home position, leaving only five other positions of the manually adjustable switch available for designating machine idleness due to other causes. These five permutations are, however, selectable at will in the manner hereinbefore described for operating the permutation relays 87, 88 and 89.

The dash-pot relay 139, when it is actuated, serves, if desired, to close a signalling circuit independent of all other circuits shown in the diagram, which circuit may be useful in giving a warning to the operator that this particular machine has stopped. Such a warning may be audible as when the bell 141 or other audible signalling device is sounded; or the signal may be visible, as when the lamp 142 is lit. In either case the operator who may at the moment be tending some other of the machines of his set, is given due warning that this particular machine is in need of his attention. The warning signal circuit derives its energy from the generator or other source 143 and the duration of the signal may be made as long as desired by adjusting the return-stroke of the relay armature 144. Such adjustment, as is well known, may readily be made by controlling a vent (not shown) in the dash pot of relay 139.

In the operation of my system it may, for example, be desirable to go the rounds of the various machines to be monitored by feeding current to each transmitting station, once every 2½ minutes. The dash-pot relay may be adjusted to maintain a closed circuit condition of its contacts 145 for a considerable fraction of 2½ minutes, and certainly for a longer time interval than that represented by one only of the many closings of contacts 112 (Fig. 4) during a period of 2½ minutes. The circuit through the dash-pot relay operates periodically whenever either of the stop motion switches 137—138 is closed. When, however, the brush 95 of the permutation switch is manually set, then, even though the brush 95 has been moved only one step and is still in contact with the segment 93' in circuit with the dash-pot relay 139, the latter will nevertheless be short circuited by the branch conductor 97'.

Another feature of the embodiment shown in Fig. 5 provides that when any particular code signal is transmitted such as one designating "fixer call," a distribution and analysis of signals can be provided so as to assign responsibility for idle time to the proper individual. Assuming, for example, that the "fixer call" signal is represented by an impulse transmitted over conductor $b$ to relay 87, then the operation of this relay will feed current from battery B to a wiper 146 of the rotary switch $R_5$. This wiper, it will be understood, is caused to contact successively with segments 147 of rotary switch $R_5$. These segments connect individually with certain plug-in connector jacks 148. Three such jacks are shown (by way of example) connected in parallel to each conductor 149. Thus any group of machines to be cared for by an individual fixer may be selectively linked to a common feeder circuit 150 for one of the dash-pot relays 151 and the actuating magnet $12_u$ for an associated register $11_u$. The cam operated contact 78 serves to complete this circuit periodically in the same manner as shown in Fig. 4. Each of the dash-pot relays 151 operates a contact spring 152 for closing a circuit from the source of current 153 to a particular annunciator which, in this case, has been indicated as a lamp 154, although, of course, a visible or audible annunciator of any type may be used. In accordance with this arrangement the proper individual is given a warning signal that he is needed for the repair of some one of the machines in his particular section. Until this man is able to put such machine in repair and get it running again the idle time will count against him in accordance with the actuation of the timing register $11_u$.

In the embodiment shown in Fig. 5, the second bank of contact segments 155 may be used for analyzing idle-time of the class that lowers the machine operator's efficiency. In this case, as has heretofore been shown, the idle-time may be the result of machine stoppage for either of two reasons, according to which particular one of the stop motion switches 137—138 happens to have closed its circuit for transmitting an idle-time signal. Considering a loom, for example, if it stops due to warp thread breakage then the warp stop motion 237 will close the switch 137, whereat a signal is transmitted over conductor $d$, the effect of which is to actuate relay 89 so as to close a local circuit at the register panel from the battery B to register actuating magnet $12_k$, thence to the brush 156 on the second level of the rotary switch $R_5$ and through one of the segments 155 by which the signal is properly distributed to a jack 157 corresponding with the loom from whose signaling box S the signal originated.

A forked two-wire cork-and-plug connector 20 (74 in Fig. 4 and 74' in Fig. 5) may here be used for connecting any number of jacks 157 with a register jack. Two registers, one an idle-time register 11 and the other a running-time register 21 may then be made responsive to signals from any of the looms in a weaver's set. Additional pairs of registers 11—21 may likewise be served by signals directed to other sets of jacks 157, according to the assignment of looms to each weaver and according to a corresponding concentration of signalling channels from selected jacks 157 through other forked cords to jacks for respective pairs of said registers.

On referring back to the description of how a signal may be initiated by the closing of switch 137 when a warp stop-motion 237 operates on a loom, it will be clear that any other stop-motion (for example, one that is controlled by a filling break) may operate the switch 138 thereby to transmit an impulse through channel $c$ to relay 88. The operation of this relay selects register actuating magnet $12_m$ for actuation. The return circuit for this magnet is common to that of $12_k$ already described. It puts different idle-time magnets 11 in series with either of the magnets $12_m$ or $12_k$ according to the selectivity of wiper 156 on rotary switch $R_5$. Hence the idle-time due to warp and filling thread breakage may be ascribed to each weaver's loom set and for all the looms it may be analyzed on registers $11_k$ and $11_m$ to determine the losses due to warp breakage relative to filling breakage.

The contact bank comprising segments 158 of the rotary switch $R_5$ is useful for feeding current from the battery B successively to the tip contacts 72 of different jacks, each corresponding with one of the machines. When machines are assigned to any particular job (there being a number of jobs running simultaneously), a 100% registration of machine hours may be obtained on separate timing registers 11, each being representative of a selected group of machines. The twin conductor cord 74" terminates in a plug 161 which may be inserted in the jack 69. This cord comprises a circuit leading to a register 21 for tabulating running-time under a job-classification. The sleeve connection of the plug 161 connects with the body of the jack 69, which in turn is connected to one of the front contacts 158 of the relay 159. The other two front contacts of the relay 159 connect respectively with jacks 157 and 160. When no plug 161 is inserted in the jack 69, then contacts 72 and 134 are closed for the purpose of transmitting signals to register 12t (Fig. 3) indicative of machine time unassigned.

It will be seen that a three-fold tabulation of running time may be had when relay 159 is actuated. This relay is actuated by current from the battery B through a segment 162 on the lowermost bank of the rotary switch R₅ when grounding contacts 112 close. The relay 159 is in shunt with a feeder circuit to a corresponding transmitting station S. If running-time signals are transmitted, they are fed back through conductor a to three movable contacts of relay 159. One set of registers 21 will receive running-time impulses as through the sleeve connection of the plug 163 for designating the operators' running-time, a second distribution of the impulse in parallel with the first will be distributable through the sleeve connection of plug 161 for designating running-time by job, as heretofore explained. Whenever it is desired that a machine should be monitored individually, the running-time thereof may be registered by plugging into the jack 160 of a single conductor cord-and-plug 164, thereby making connection with an individual register 21.

Since the arrangement shown in Fig. 5 requires as many relays 159 as there are machines to be monitored, it is perhaps a matter of economy to provide a rotary switch having more than four banks of segments, and thus to eliminate the need for relays. Such a modification may, therefore, be preferred, as shown in Fig. 6, in which a rotary switch is provided having five main banks of segments. Two of these banks are provided with split segments insulated from one another, although their wipers are electrically connected. Such an arrangement may be provided in commercially available apparatus and has the advantage that current may be fed to the individual signalling devices attached to the different machines while synchronously distributing the signalling impulses from their respective stations S in accordance with a number of different classifications. To illustrate the possibilities in this direction Fig. 6 shows an arrangement of wipers and segments as follows: Wiper 165 connects battery through segments 166 with the different feeder circuits 97 leading respectively to stations S. Wiper 165 also feeds current from the battery through segments 167 to the 100% running-time registers for accumulating such time by jobs. Running time signals from stations S are distributed by wiper 168 through segments 169 and 170 to registers for designating the running time by jobs, and by individual machines, if desired. Wiper 171 similarly distributes the same signals to registers for tabulation of the running-time of the machines according to operator's groups. Finally there are two upper contact banks, 174 and 176 the wipers 173 and 175 of which correspond with wipers 156 and 146 respectively as shown in Fig. 5. In one case the operator's idle-time may be accumulated on registers individual to each operator; in the other case the fixer's idle-time may be correspondingly registered in accordance with each fixer's section.

Fig. 10 shows a modification of the manual switch such as may be used in a signal box S''. The device S'' is shown connected with a productive machine whose operation is to be monitored. Like reference numerals refer to like parts as otherwise shown in Figs. 7 and 8. The shaft 76 is connected by a link 177 with a suitable shaft on the machine. The modification is characterized principally by the substitution of one bank of contact segments instead of two for composing the permutational elements of an idle-time signal. Three tandem-disposed brushes 178 are mounted on the rotatable brush holder 179, which is carried by and insulated from the shaft 86. Current is impulsively fed by conductor 97 to the brush collector ring 180. The brushes 178 are shown in the home position where they are not in contact with any active segment. The various segments 181 are so connected respectively with conductors b, c and d that, as the knob 86 is turned, any one of seven different code combinations will be set up. These may readily be analyzed by tracing the connections between the segments and the rectifiers 98 for the respective conductors b, c and d. It is immaterial that one or more of the signals may be duplicated at different settings of the switch. The seven possible combinations of selection of the three conductors are made available as shown.

Recapitulation

In the foregoing detail description of my invention, its application to the monitoring of looms has been referred to by way of illustration. Applications to other types of machinery, and even to operations that are largely manual in character, are too numerous to mention. In general, however, it may be seen that the utility of my invention is greatest where there is considerable complexity in the co-ordination of different operations as performed by different productive units, or groups of units. If the movement of material in process from one stage to another is properly controlled, then it does not pile up excessively at different points, nor is there a lack of material where machinery and operators are available to put it through the next succeeding step of the process. It is only by taking note of the departures from a predetermined production schedule that a supervisor can take action to improve the efficiency and to speed up the flow of work.

In the register panel an ever-changing picture of progress throughout the plant is available. At the beginning of each week readings of all the registers may be transcribed or photographed. Further readings may be obtained as often as desired for noting the elapsed running-time in comparison with the 100% machine hours, and for noting the elapsed idle-time due to various causes.

In some instances it may be desirable to employ registers 11 and 21 of the so-called "re-set" type. To do this requires no change in the structure or operation of my invention, since my improved register-actuating device may be geared, belted or linked to any suitable counter, as is well understood by those skilled in the art.

Furthermore, it would be no departure from the spirit and scope of my invention to actuate a pen-recording chart instrument of any of the types well known and heretofore considerably used for denoting the times and frequency of occurrence of any event such as a period of machine idleness. I have shown such an instrument in Fig. 12, wherein the principles of my invention are deemed to be well exemplified. It is apparent, however, that the magnets 12 or 22 might well be utilized for individually controlling each of a plurality of pen-arms of a recording instrument.

The few timing registers shown in Fig. 3 are but typical of those which would normally be used in great numbers in a large industrial plant. For payroll records there should be a separate register to accumulate machine running time to be credited to each machine operator. If the pay were to be figured on the basis of this running time, rather than on subsequently compiled estimates of quantities produced, the operators would be assured of a more equitable compensation for their efforts. The effects upon their wages of variations in machine speeds would also be removed, thereby rendering the labor conditions more satisfactory.

For production control there should be a register assigned to each kind of product or job order. For time-study work there should be a certain number of registers 21 available to follow the operation of individual machines as occasion may require. This has been mentioned in the foregoing description of Fig. 5. Finally, for supervisory control of the retarding factors, a sufficient number of idle-time registers 11 should be employed so that, depending upon the nature of the work, the predominant factors of lost time may be quantitatively analyzed.

Such, in general, is of the essence of this invention. It is to be understood, however, that modifications may be made without departing from the spirit and scope of what is herein taught. I do not intend, therefore, to be limited except insofar as is necessitated by the prior art and by the scope of the appended claims.

I claim:

1. Apparatus for producing at a central station a condensed tabular registration of elapsed running time and idle time in respect to a plurality of productive units, comprising means under control of said productive units for transmitting impulses indicative of elapsed running time, additional means associated with the first said means and at times manually operable for transmitting impulses indicative of idleness of said productive units for any of a plurality of assignable causes, a timing device, means including a plurality of timing registers, under the joint control of said timing device and of the first said means for tabularly registering the elapsed running time by groups of said units according to a predetermined classification of said units and again by different groups according to a different classification of said units, means including a second plurality of timing registers under the joint control of said timing device and of said additional impulsing means for tabularly registering the elapsed idle time of said units according to the causes for such idleness, and means including preadjustable circuit connections from the impulse and the signal transmitting means to said timing registers for determining each group of productive units in respect to which elapsed time registrations are to be made.

2. Apparatus in accordance with claim 1 in which said additional signalling means comprises a manually settable switch associated with each productive unit, the switch being adapted to be set to a signalling position only when the productive unit is stopped, and means for restoring said switch to a non-signalling condition upon the starting-up of the productive unit with which said switch is operatively associated.

3. In combination with a productive machine having a plurality of stop-motions, each stop-motion being operative in response to the rise of a particular cause of shut-down, monitoring apparatus comprising means for transmitting signals, each signal being so characterized as to denote the cause of shut-down, means for periodically repeating said signal for the duration of the shut-down, and means including a plurality of timing registers for tabularly accumulating in response to said signals the elapsed time in respect to each class of machine idleness as determined by the particular stop-motion that is operated in each instance.

4. In combination with a plurality of productive machines having stop-motion devices, a monitoring system comprising circuit-closing devices attached to said stop-motion devices and operative therewith, a timing mechanism and means including a plurality of timing registers operative under the joint control of said timing mechanism and of said circuit-closing devices when a machine is idle for accumulating the idle time thereof in synoptic arrangement according to each of a plurality of assignable causes of machine stoppage, and selective means for causing each of said registers to be connected in common to the circuit closing devices on a plurality of productive machines, a separate register being provided for each class of stop-motion devices on said machines, thereby to designate the time lost on account of stoppage for different causes.

5. The invention set forth in claim 4 in which the monitoring system comprises further means including selective circuits and a manually adjustable switch adjacent each machine and additional timing registers operative under the joint control of said timing mechanism, said selective circuit means and said manually adjustable switch, said registers being adapted to synoptically accumulate time lost on account of inability of the operator to again start his machine due to one cause or another beyond his immediate control, as indicated by the setting of said manually adjustable switch, a register being provided for each of a plurality of the usual causes of that nature.

6. In a work-meter system applicable to the measurement of running time of a plurality of productive machines, a first set of timing registers, selective means for rendering each register operable according to a desired group of machines to each of which it is cyclically connected, at least one other set of timing registers adapted to function alternatively like the first set, and time-controlled means for transferring the connections from one to another of said sets upon shifting from one to another crew of operators of said machines.

7. In combination with a machine whose periods of operation and of idleness are to be tabularly registered, means under control of the machine when it is running for periodically and intermittently transmitting impulses indicative of running time intervals, a register operable under control of said impulses to register accumulations of running-time in respect to said machine, means under control of an operator of said machine when it is idle for intermittently transmitting impulses over a predetermined permutational selection of circuits having relay means therein whose joint actuation serves to identify the particular causes for machine idleness, secondary circuits selectively closable by said relay means, and a plurality of elapsed time registers operable under control of periodic impulses transmitted through said secondary circuits for tabularly registering accumulations of idle time in respect to said machine, the idle time accumulations being separately registered according to the respective causes therefor.

8. In a tabulative telemetering system, a plurality of productive machines the elapsed running time and the elapsed idle time conditions of which are to be registered, a signalling device operatively connected with each machine and comprising both machine operated and manually settable switches, a timing mechanism, an elapsed time tabulator comprising a plurality of selectively operable registers under the joint control of said timing mechanism and of the signalling devices, a transmission system connecting said signalling devices with the registers of said tabulator and having a conductor individual to each signalling device and a plurality of conductors common to all of the signalling devices, means under control of said timing mechanism for periodically energizing the individual conductors successively and in rotation, and means including unidirectional devices electrically connecting said signalling devices with said common conductors for preventing the transposition of signals as impressed upon said common conductors.

9. In a tabulative telemetering system in combination with a plurality of productive units the working and idle conditions of which are to be registered, a signal transmitting device under separate control of each said unit while it is running and adapted to be manually adjusted only when the unit is idle, time controlled means including rotary switches for periodically and successively supplying current to each said transmitting device, means including relays permutationally controlled by said transmitting devices for interpreting the selective function of certain of the signals initiated by said signal transmitting devices, tabulative means including a plurality of elapsed time registers selectable in part by said rotary switches and in part by said relays and thereby caused to respond to the control of said signal transmitting devices for accumulating a plurality of synoptic totals of elapsed time in respect to the working and idle conditions of said productive units, and means including circuits selectively connectable between said signal transmitting devices, said rotary switches, said relays and said registers for predetermining the response of said registers to said signals according to any desired grouping of said units into operators' sets, or by kinds of product to which said units are assigned, and according to a plurality of different causes to any one of which the said idle conditions may be assigned.

10. In a timing system, in combination with a plurality of machines the working conditions of which are to be tabulated, means operatively connected with each said machine for monitoring said conditions, a plurality of elapsed-time registers selectively operable under control of said monitoring means, and means for so determining the selection of registers to be operated in each instance that each of a first set of said registers will accumulate the working time of its predetermined group of said machines as classified according to one analytical basis and each of a second set of said registers will accumulate the working time of its predetermined group of said machines as classified according to a second analytical basis.

11. A timing system in accordance with claim 10 and having further means for disabling the monitoring means in respect to any of the machines to be excluded from the predetermined groups due to lack of orders or absence of the operator, and means including an additional elapsed time register for accumulating machine hours in respect to the machines so excluded.

12. In a timing system, a plurality of productive units, the idle conditions of which are to be timed and tabulated, a plurality of elapsed-time registers, means manually adjustable upon the stoppage of any one of said productive units for monitoring said conditions and for transmitting impulses during idleness periods in respect to any of said units in response to which said registers are actuated, an elapsed-time register assigned to the function of accumulating time lost by any of said productive units for lack of assignment of work to be performed thereon, manually adjustable means for rendering the last said register operable and means operating in conjunction with the last said register when it is actuated for preventing the actuation of any of the first said registers.

13. In a work-meter system applicable to the group analysis and measurement of running time of a plurality of productive machines, means operatively connected with each said machine for transmitting impulses indicative of a running condition, time controlled switching means for picking up said impulses in periodic succession from different individual machines, a plurality of impulse-controlled timing-registers, including a running-time register and a full-time register for each group of machines, and manually adjustable means firstly for predetermining the particular machines to be included in each group, secondly for causing said impulses to be distributed to a different running-time register for each group, and thirdly for causing a companionate full-time register to accumulate a 100% total of machine hours for its group.

14. In combination with a plurality of machines having signalling means operatively connected therewith, a plurality of elapsed-running-time registers, a timing mechanism, register-actuating devices under the joint control of said timing mechanism and of said signalling means, switching means operative under control of said timing mechanism for establishing electrical circuits periodically and successively through different ones of said signalling means and also simultaneously in parallel branches through a selected plurality of said actuating devices, and means including volitionally adjustable connections between said switching means and said actuating devices whereby tabulated totals of actual running-time in respect to selected groups of said machines are accumulated on said registers, the group selected through one of said parallel branches being according to one basis of classification of said machines and the group simultaneously selected through another of the parallel branches being according to an independent basis of classification.

15. The invention set forth in claim 14 in combination with an elapsed-running time register, an actuating device therefor, means including suitable circuit connections between said actuating device and the signalling means for causing said register to accumulate a grand total of running machine hours for a given period in respect to all of the machines, and registering means for simultaneously accumulating the elapsed mill-hours during the same period.

16. In combination with a plurality of machines whose periods of operation and of idleness are to be tabularly registered, means under control of each machine when it is running for periodically and intermittently transmitting signals indicative of running-time intervals in respect to that particular machine, a plurality of elapsed time registers, each responsive to such of said signals as relate to the running-time of a predetermined group of said machines, manually settable means associated with each machine and operable only when the machine is stopped for periodically and intermittently transmitting idle-time signals, and a plurality of idle-time registers each adapted to respond to such of said idle-time signals as relate to machine idleness assignable to a specific cause as denoted by the adjustment of said settable means.

17. In a timing system, a plurality of productive units the idle conditions of which are to be synoptically registered, means including switches and circuits connected to said units and operable when the unit becomes idle for monitoring said conditions, said means being adjustable in each instance to precondition a group of said circuits for transmitting impulses thereover in permutational selections thereby to designate the cause of idleness of any one of said productive units, a plurality of elapsed time registers, timing means for determining the rate of advancement of said registers, and means operative under control of said monitoring means for causing said registers to be selectively actuated in accordance with the idle time synoptically accumulated under different idleness-cause captions.

18. A system in accordance with claim 17 and having means including a stop-motion device operable by the production unit when it is to be automatically stopped for closing the switch of said monitoring means, said stop-motion device being operable upon restarting said productive unit to open said switch.

19. A system in accordance with claim 17 including in said monitoring means a manually adjustable switch for designating certain predetermined causes of idleness and at least one stop-motion device connected to said unit and having associated therewith a switch automatically operable in response to the stopping of the productive unit for establishing a certain predetermined permutational selection of said circuits thereby to designate the stoppage of said unit under control of said stop-motion device.

20. In combination with a productive machine, monitoring apparatus comprising switching means for transmitting any one of a plurality of different signals each signal being characterized to indicate a particular idle-time condition in respect to said machine, a plurality of signalling channels selectively operable by said switching means, means under control of currents directed into said channels for registering said idle-time conditions, and further means under control of the machine while it is running for preventing the transmission of signals by said switching means.

21. In a tabulative telemetering system, a plurality of productive machines, the elapsed running time and the elapsed idle-time conditions of which are to be registered, a signalling device operatively connected with each machine and comprising both machine operated and manually settable switches, a timing mechanism, means for causing said signalling device to transmit impulses under control of said timing mechanism, a plurality of signalling channels and an elapsed time tabulator comprising a plurality of selectively operable registers under control of impulses transmitted through said signalling channels, and means operable by any one of said machines when it stops for initiating the transmission of impulses to certain of said registers thereby to accumulate totals of machine idleness time on said registers selectively in dependence upon the cause of such idleness, said registers being receptive of impulses from different groups of said productive machines so as to obtain condensed tabular registrations of elapsed time in respect to the idleness of said machines.

22. The combination of an operable machine, a plurality of stop-motions each adapted to stop the machine upon the occurrence of a specific type of failure of said machine to properly function, a plurality of registers, timed impulse responsive means for advancing said registers, means operable under control of any one of said stop-motions, when it is actuated, for selecting an appropriate one of said registers to be advanced, and means for rendering said impulse responsive means effective only so long as the machine remains idle.

23. The combination of a productive machine having a stop-motion adapted to stop the machine, a register, intermittently operable register controlling means, and means dependent upon the stoppage of the machine by the stop motion for enabling said controlling means to advance the register.

24. The combination of a loom, a filling stop-motion and a warp stop-motion each adapted to stop the loom, a pair of registers, intermittently operable register controlling means, means dependent upon the actuation of the filling stop-motion for causing said controlling means to advance one of said registers, means dependent upon the actuation of the warp stop-motion for causing the controlling means to advance the other of said registers, a timing device for continuing the operation of said controlling means, and means dependent upon the re-starting of the loom for terminating the intermittent advancement of either of said registers, thereby to measure the duration of loom idleness due to stoppage by the respective stop-motions.

RALPH W. BUMSTEAD.